(12) United States Patent
Fernandez et al.

(10) Patent No.: US 7,221,387 B2
(45) Date of Patent: *May 22, 2007

(54) DIGITAL TELEVISION WITH SUBSCRIBER CONFERENCE OVERLAY

(75) Inventors: Dennis S. Fernandez, 1175 Osborn Ave., Atherton, CA (US) 94027; Irene Y. Hu, Belmont, CA (US)

(73) Assignee: Dennis S. Fernandez, Atherton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/444,261

(22) Filed: May 22, 2003

(65) Prior Publication Data

US 2003/0193559 A1 Oct. 16, 2003

Related U.S. Application Data

(60) Continuation of application No. 10/026,095, filed on Dec. 21, 2001, now Pat. No. 6,590,602, which is a division of application No. 09/095,390, filed on Jun. 10, 1998, now Pat. No. 6,339,842.

(51) Int. Cl.
  *H04N 7/14* (2006.01)
(52) U.S. Cl. ............... 348/14.08; 348/14.09; 725/62; 725/64
(58) Field of Classification Search .. 348/14.01–14.09, 348/14.11, 14.12, 14.13; 455/550.1, 556.1, 455/556.2, 557, 558; 725/62, 63, 64; 434/350, 434/356, 362
See application file for complete search history.

(56) References Cited

U.S. PATENT DOCUMENTS

| | | | |
|---|---|---|---|
| 4,847,698 A | 7/1989 | Freeman | |
| 4,918,516 A | 4/1990 | Freeman | |
| 5,038,211 A | 8/1991 | Hallenbeck | |
| 5,371,534 A | 12/1994 | Dagdeviren et al. | |
| 5,397,133 A * | 3/1995 | Penzias | 463/22 |
| 5,491,797 A | 2/1996 | Thompson et al. | |
| 5,504,933 A | 4/1996 | Saito | |
| 5,515,099 A | 5/1996 | Cortjens et al. | |
| 5,534,914 A | 7/1996 | Flohr et al. | |
| 5,600,364 A | 2/1997 | Hendricks et al. | |

(Continued)

FOREIGN PATENT DOCUMENTS

GB    2313251 A  * 11/1997

(Continued)

OTHER PUBLICATIONS

Yang Sung-Jin "Samsung. Lg Plan digital TV as new cas cow", The Korea Herald, Apr. 21, 2003. www.koreaherald.co.kr/servlot/cms.articleview.

(Continued)

*Primary Examiner*—Melur Ramakrishnaiah
(74) *Attorney, Agent, or Firm*—Fernandez & Associates, LLP

(57) ABSTRACT

Digital television system overlays subscriber two-way communication during broadcast program delivery to create virtual audience community. Individual or group billing and advertisement is personalized per DTV receiver program viewing and/or conferencing activity. Subscriber receiver includes camera and other media I/O device for multi-way video conferencing. Participants may be added or removed dynamically during programming or conferencing.

78 Claims, 5 Drawing Sheets

U.S. PATENT DOCUMENTS

| | | | |
|---|---|---|---|
| 5,615,131 A * | 3/1997 | Mortensen et al. | 709/206 |
| 5,675,375 A | 10/1997 | Riffee | |
| 5,689,553 A | 11/1997 | Ahuja et al. | |
| 5,701,161 A | 12/1997 | Williams et al. | |
| 5,729,549 A | 3/1998 | Kostreski et al. | |
| 5,734,413 A | 3/1998 | Lappington et al. | |
| 5,818,513 A | 10/1998 | Sano et al. | |
| 5,823,879 A * | 10/1998 | Goldberg et al. | 463/42 |
| 5,913,040 A | 6/1999 | Rakavy et al. | |
| 5,966,442 A * | 10/1999 | Sachdev | 380/212 |
| 5,999,207 A * | 12/1999 | Rodriguez et al. | 348/14.03 |
| 6,023,499 A * | 2/2000 | Mansey et al. | 379/111 |
| 6,038,599 A * | 3/2000 | Black et al. | 709/223 |
| 6,062,981 A * | 5/2000 | Luciano, Jr. | 463/26 |
| 6,075,553 A * | 6/2000 | Freeman et al. | 348/14.08 |
| 6,117,013 A * | 9/2000 | Eiba | 463/41 |
| 6,133,912 A * | 10/2000 | Montero | 715/716 |
| 6,183,364 B1 * | 2/2001 | Trovato | 463/32 |
| 6,205,209 B1 * | 3/2001 | Goldberg et al. | 379/93.15 |
| 6,236,805 B1 * | 5/2001 | Sebestyen | 386/98 |
| 6,243,129 B1 * | 6/2001 | Deierling | 725/105 |
| 6,396,480 B1 | 5/2002 | Schindler et al. | |
| 6,418,214 B1 | 7/2002 | Smythe et al. | |
| 6,530,840 B1 * | 3/2003 | Cuomo et al. | 463/42 |
| 6,741,833 B2 * | 5/2004 | McCormick et al. | 434/350 |
| 2002/0059581 A1 | 5/2002 | Billock et al. | |

FOREIGN PATENT DOCUMENTS

| | | | |
|---|---|---|---|
| JP | 02084177 | | 12/1991 |
| JP | 03143060 | | 12/1992 |
| JP | 05-145918 | * | 6/1993 |
| JP | 05-091505 | * | 9/1993 |
| JP | 05-316107 A | * | 11/1993 |
| JP | 05160913 | | 1/1995 |
| JP | 06-266553 | | 5/1996 |
| JP | 08222068 | | 3/1998 |

OTHER PUBLICATIONS

Yoshiko Hara. "Japan to begin DTV broadcasts in December", EE Times. Apr. 18, 2003. URL.http://www.eetimes.com/story/OZG2003041850042.

Steven Vedro "Beyond the VBI—High-Speed Broadcasting and Enhanced TV" Info. p @ ckets. Dec. 1997 Http://www.cpb.org/Library/infopackets/packet3/html.

Janice Jones "Projecting the Television Audience in the Digital Future" Corporation for Public Broadcasting 1998 Http://www.cpb.org/Library/presentations/esomat.html, no month/year provided.

Sinan Y. Othman "White Paper Interactive Data Services for Television" Mar. 1998 www.teralogic-inc.com/products/internettv/WhitePaper.html.

Neil Mitchell "Programmable Architecture for Digital Television" Apr. 9, 1998.

"Management of Multimedia Services" Feb. 1997.

Dawson, F., "Video Perks Give Data a Sharper Image", Sep. 1997, Communication Engineering & Dessign <http://www.cedmagazine.com/ced/9709/9709d.htm>, 7 pages.

* cited by examiner

DIGITAL TELEVISION WITH SUBSCRIBER CONFERENCE OVERLAY

RELATED U.S. APPLICATION DATA

This application is a continuation of U.S. patent application Ser. No. 10/026,095 filed on Dec. 21, 2001 now U.S. Pat. No. 6,590,602; which is a divisional of U.S. patent application Ser. No. 09/095,390 filed on Jun. 10, 1998, and issued on Jan. 15, 2002 as U.S. Pat. No. 6,339,842 B1, all entitled "DIGITAL TELEVISION WITH SUBSCRIBER CONFERENCE OVERLAY" by FERNANDEZ, et al.

FIELD OF INVENTION

The invention relates to digital television systems, particularly to subscriber video conferencing with conventional programming.

BACKGROUND OF INVENTION

Digital television (DTV) attributes have been standardized by industry (e.g., Advanced Television Systems Committee (ATSC) and government (U.S. Federal Communications Commission (FCC)). Such DTV standards, which provide enhanced multimedia quality, as well as interactive data services, are hereby incorporated by reference. Generally, however, DTV specifications contemplate program delivery to various receiver units, but not necessarily communication between receiver units. Accordingly, there may be need for conferencing between units receiving digital system programming.

SUMMARY OF INVENTION

The invention resides in digital television system configured for subscriber conference overlay during program delivery. Billing and advertisement may be personalized according to actual program viewing and/or conferencing activity by DTV receiver. Receiver unit includes media input/output device for multi-user conferencing. Subscribers may be added or removed during programming.

DETAILED DESCRIPTION

Figure 1:
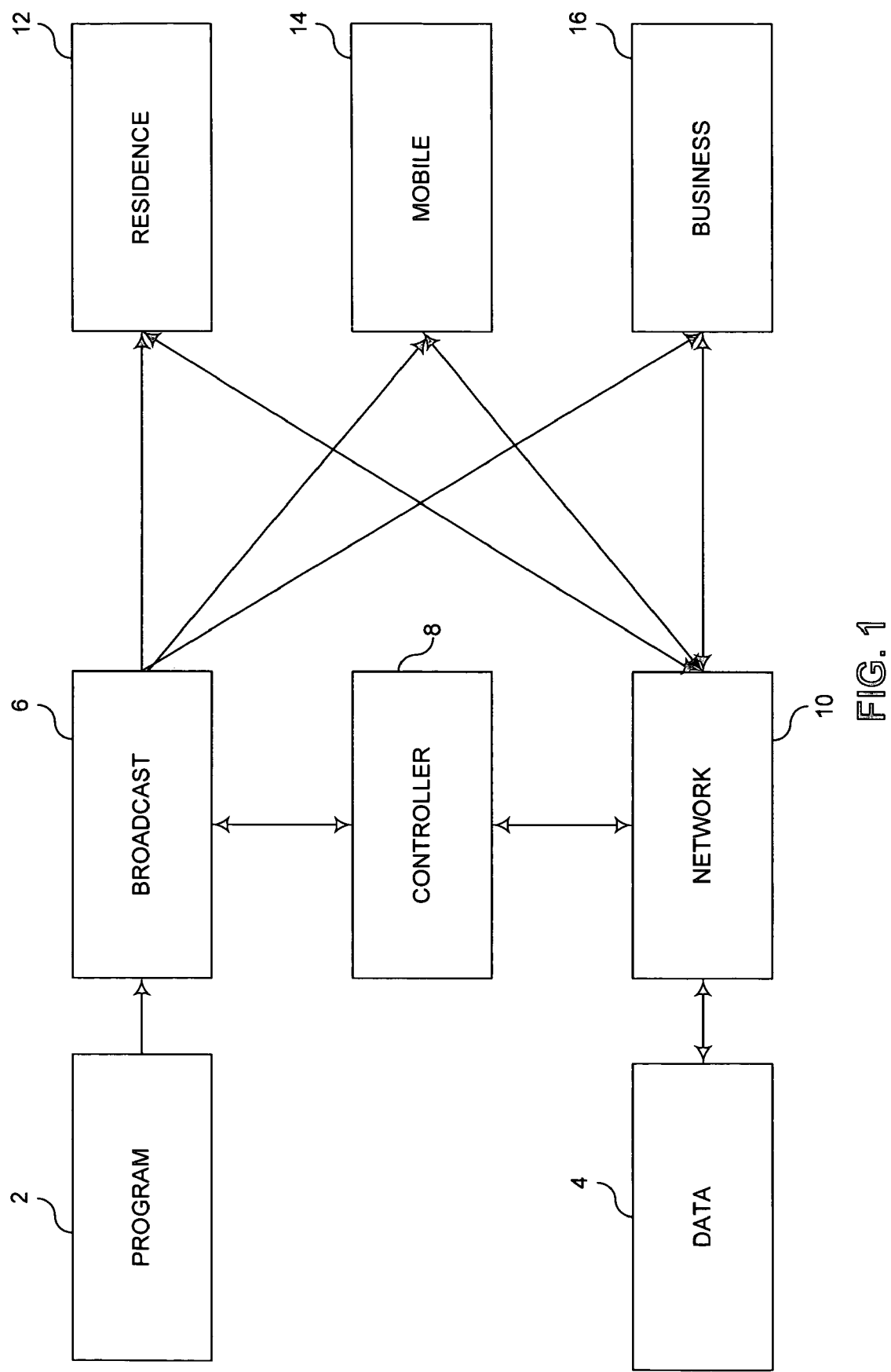
FIG. 1 is block diagram of integrated digital television program and data delivery system for enabling present invention.

FIG. 1 is block diagram of integrated digital television program and data delivery system, including one or more residential 12, mobile 14 and business 16 subscriber, receiver and/or digital television (DTV) units coupled over broadcast 6 and/or network 10 channels respectively to program 2 and/or data 4 sources. Controller 8, which is one or more processor, server, computer or other functionally equivalent controller functionality coupled to broadcast 6 and/or network 10 channel, may affect network 10 and broadcast 6 functionality as described herein.

Program source 2 comprises one or more source for broadcasting one or more video and/or data programs, or other functionally equivalent information signal stream, according to conventional digital and/or analog program broadcasting, accessible or addressable publicly or privately over various broadcast 6 equipment, medium, or other functionally equivalent channels, such as cable, optical fiber, microwave, wireless radio frequency (RF) transmission, direct broadcast satellite (DBS), multichannel multipoint distribution system (MMDS), local multipoint distribution service (LMDS), etc. For example, program 2 may comprise live sports or entertainment performance event, such as professional football game, broadcast over restricted pay-per-view television channels.

Data source 4 comprises one or more source for providing two-way or interactive access to one or more database, file, directory, or other functionally equivalent data repository site or signal source, accessible or addressable publicly or privately over conventional network 10, such as local or wide area network, world-wide web Internet/intranet, or combination thereof, including, for example, network switch, router, bridge, gateway, hub, or other wired and/or wireless networking connection equipment for enabling ISDN, SONET, ATM, frame relay, gigabit Ethernet, TCP/IP, virtual private networks, xDSL, or other similar functionality. Additionally, data 4 may comprise text, graphics, video, or other digital or media information, such as current news update, photographic images, video or audio clips, sports statistics or analysis, stock quotes or financial data, weather forecast report, research data, commercial transaction details, product pricing, etc.

In accordance with important aspect of present invention, digital television system includes multiple receivers coupled selectively or programmably to program 2 and/or data 4 source over broadcast 6 and/or network 10 communications infrastructure, wherein conferencing or communication among DTV subscribers 18 occurs during program and/or data delivery. Consequently, controller 8 may send or transmit service bill indication to participating DTV units per actual program view or conference usage. As used herein, term "conference" or "conferencing" is interpreted broadly and understood to mean any communication between multiple parties.

Additionally, controller may facilitate electronic narrowcast delivery of personalized or customized commercial and/or non-commercial message to select DTV units. Controller 8 and/or subscribers 18 may employ one or more intelligent agents or functionally equivalent software constructs to search, obtain, or transact certain information or activity across network 10. Controller 8 or subscriber unit 18 processor may selectively restrict or censor pre-defined program or data classes or titles, for example, to content screening criteria and/or procedure provided for so-called V-chip specifications. Preferably, each DTV receiver includes searchable and/or identifiable address and various multimedia input/output device capability for enabling video conferencing. Moreover, DTV units may be added or removed during conference period.

Figure 2:
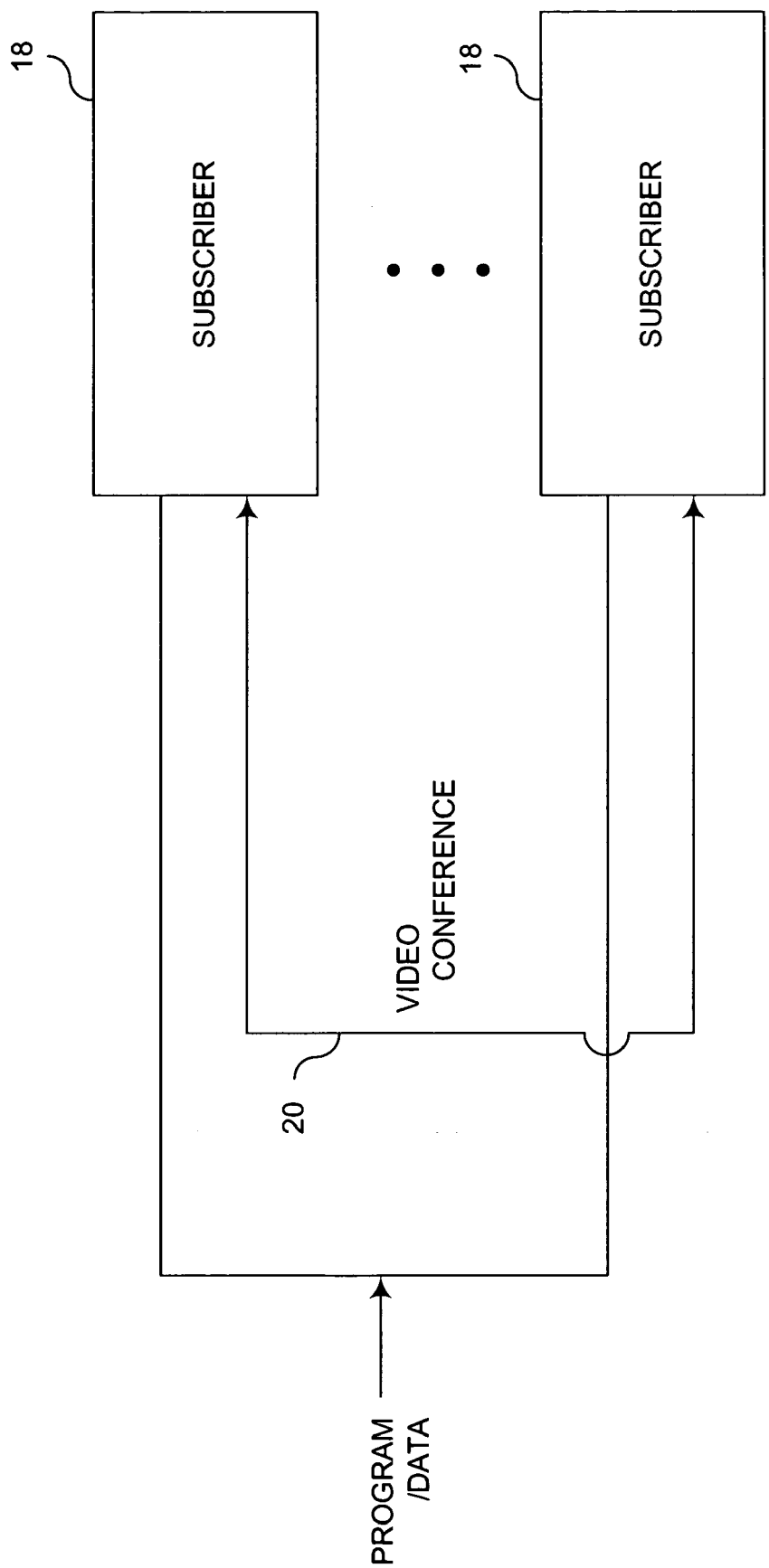
FIG. 2 is simplified diagram of novel overlay of subscriber conferencing over program and/or data delivery.

Accordingly, FIG. 2 shows overlay of subscriber conferencing 20 over program and/or data delivery to subscribers 18. In this networked configuration, controller 8 effectively serves as broadband system headend processor for generating, forwarding, modifying, storing, accessing or otherwise controlling program/data delivery to subscribers 18, while generating, forwarding, modifying, storing, accessing or otherwise controlling video conferencing signal transmission between subscribers 18.

Preferably, such program/data signal generated, transmitted or otherwise processed to receiver units comply with established DTV standards, such as ATSC or other generally accepted industry DTV information or signal format and/or protocol interface, and video conferencing signal generated, transmitted or otherwise processed between receiver units comply with established video conferencing standards, such as H.323, H.324, H.320, T.120 or other generally accepted industry video/data conferencing information or signal format and/or protocol interface, such currently published or online-accessible standards being hereby incorporated by reference.

Figure 3:
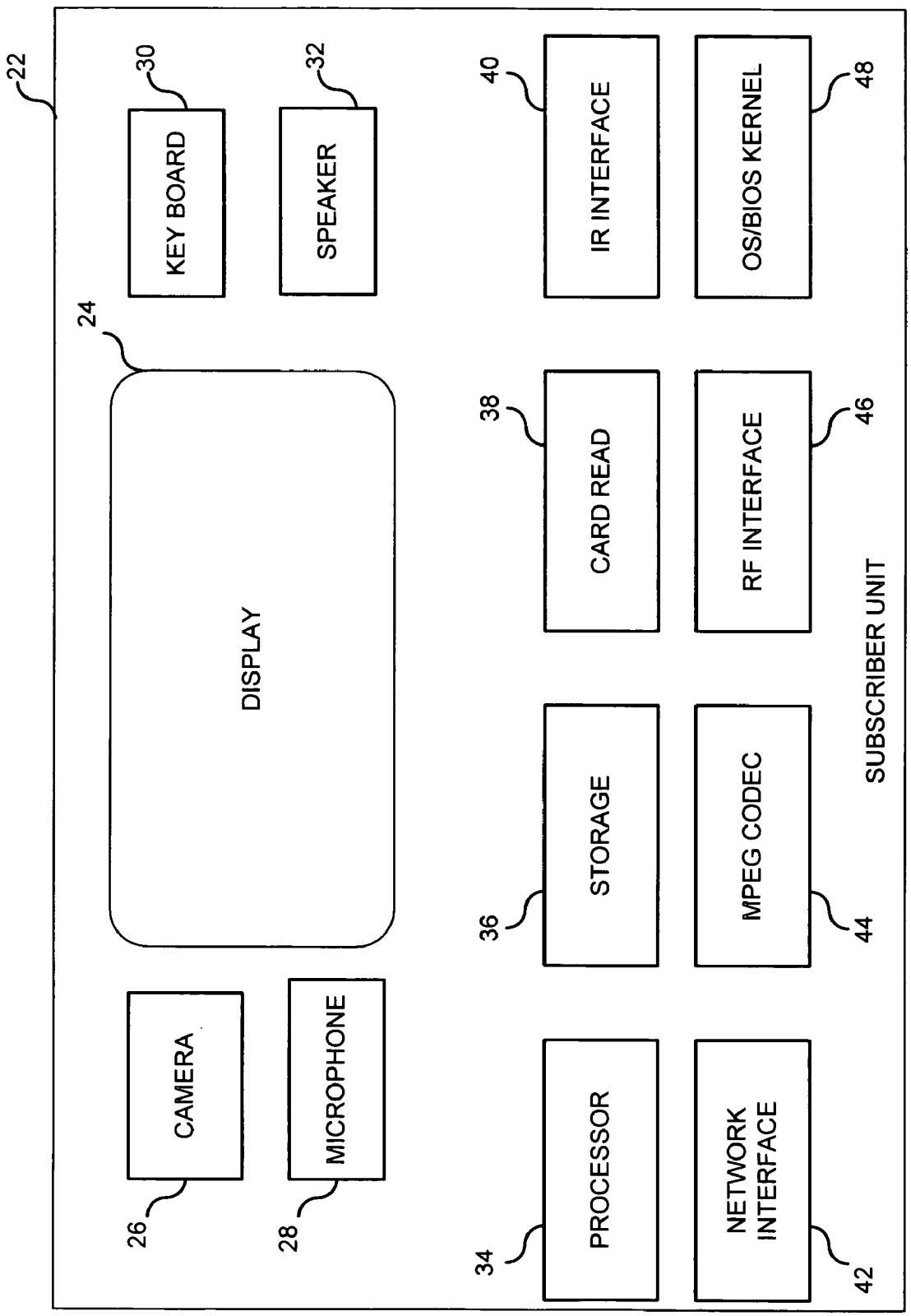
FIG. 3 is representative digital TV subscriber unit used according to present invention.

FIG. 3 shows digital television subscriber unit 22, which may be implemented as one or more DTV receivers 12, 14, or 16 of FIG. 1. Preferably, DTV unit 22, which functions in compliance with Advanced Television Systems Committee (ATSC) standard for DTV equipment and system operation, substantially includes display panel or screen with video frame buffer 24, digital video-conferencing camera or image sensor 26, microphone 28, keyboard and/or mouse 30, speaker(s) 32, processor or controller 34, digital memory or recordable video disk storage 36, peripheral card reader 38, remote control infrared interface 40, network interface or modem 42 (e.g., for coupling to network channel 10), digital compressed video encoder/decoder (i.e., according to Moving Pictures Experts Group (MPEG) industry standards)), radio frequency (RF), broadband or wireless communications interface 46 (e.g., for coupling to broadcast channel 6), and operating system, BIOS, browser, or other associated kernel software 48 for generally enabling system and controller 34 operation and network communications.

It is contemplated that ATSC-compliant DTV unit 22 may be embodied as well in personal or network computer, workstation, set-top television device, or functionally equivalent processing and associated network equipment, as configured to operate as specified herein according to present invention.

Moreover, controllers 8, 34 execute one or more computer programs for performing functions as described herein, preferably according to embedded or real-time software syntax, such as JAVA and/or Windows CE, which currently published or on-line specifications are hereby incorporated by reference.

Figure 4:
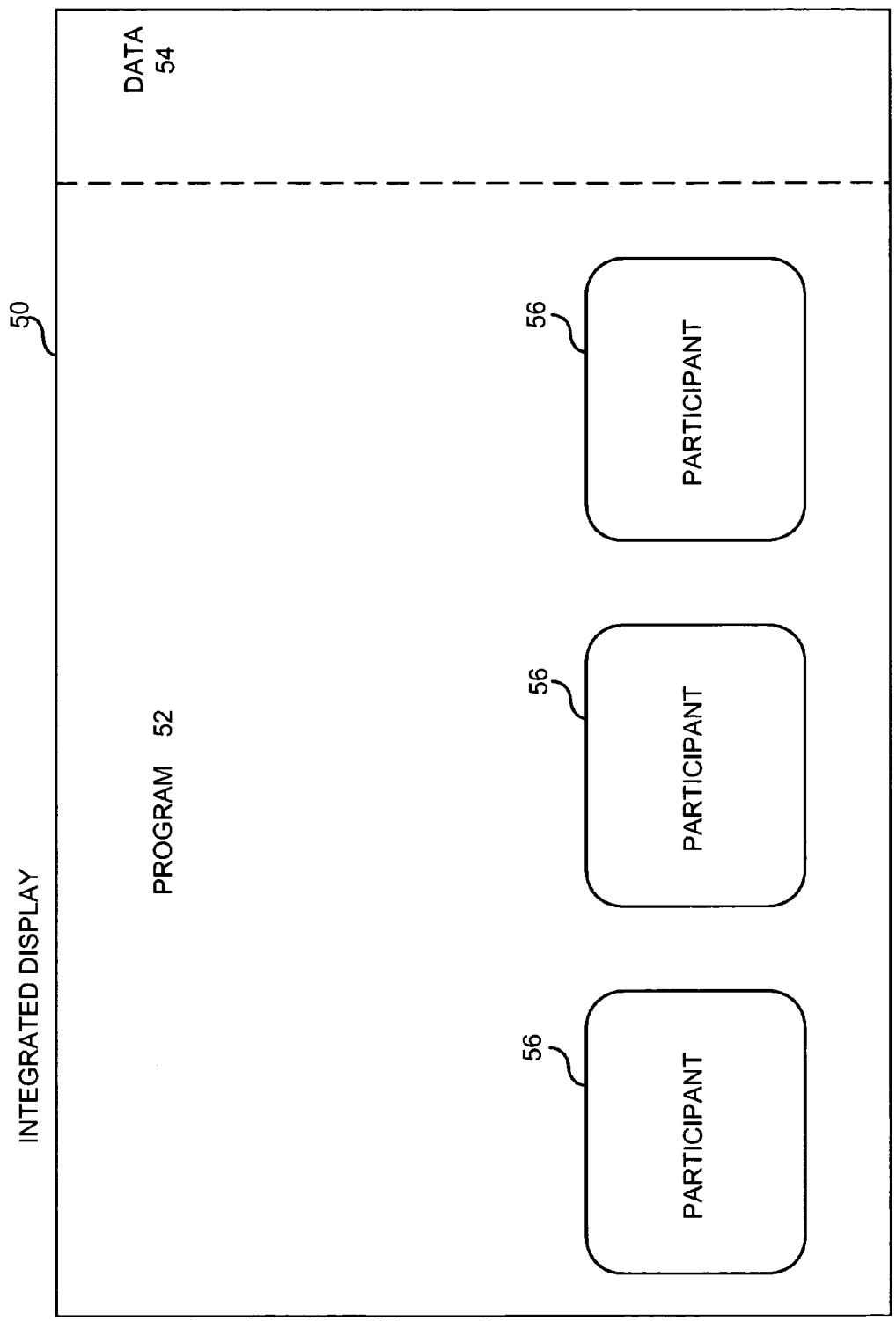
FIG. 4 is sample digital TV display according to present invention.

When DTV unit 22 operates according to present invention, sample display 24 screen output may be as represented in FIG. 4. In particular, display 24 may integrate, combine, mix, or otherwise include program 52 and/or data 54, effectively through video frame buffer, with video conferencing windows from current (i.e., self) and/or other DTV participants 56 coupled thereto, preferably during program/data delivery. For example, each screen element 52, 54, 56 may be shown as picture within or adjacent to another picture element. In this overlaid manner, each DTV unit in select set displays common program and/or data stream, as well as conference video and audio signal output as generated from video camera and microphone from other participant DTV units.

Preferably, such program and/or video signals are compressed and encoded according to industry standard such as MPEG format. Display 50 may also show whiteboard-type screen commonly among participants 56 for jointly communicating text, graphics, or other observable or audible program or data, such as for workgroup or class collaboration to review or discuss draft documents, faxes, or other forms or files.

Figure 5:
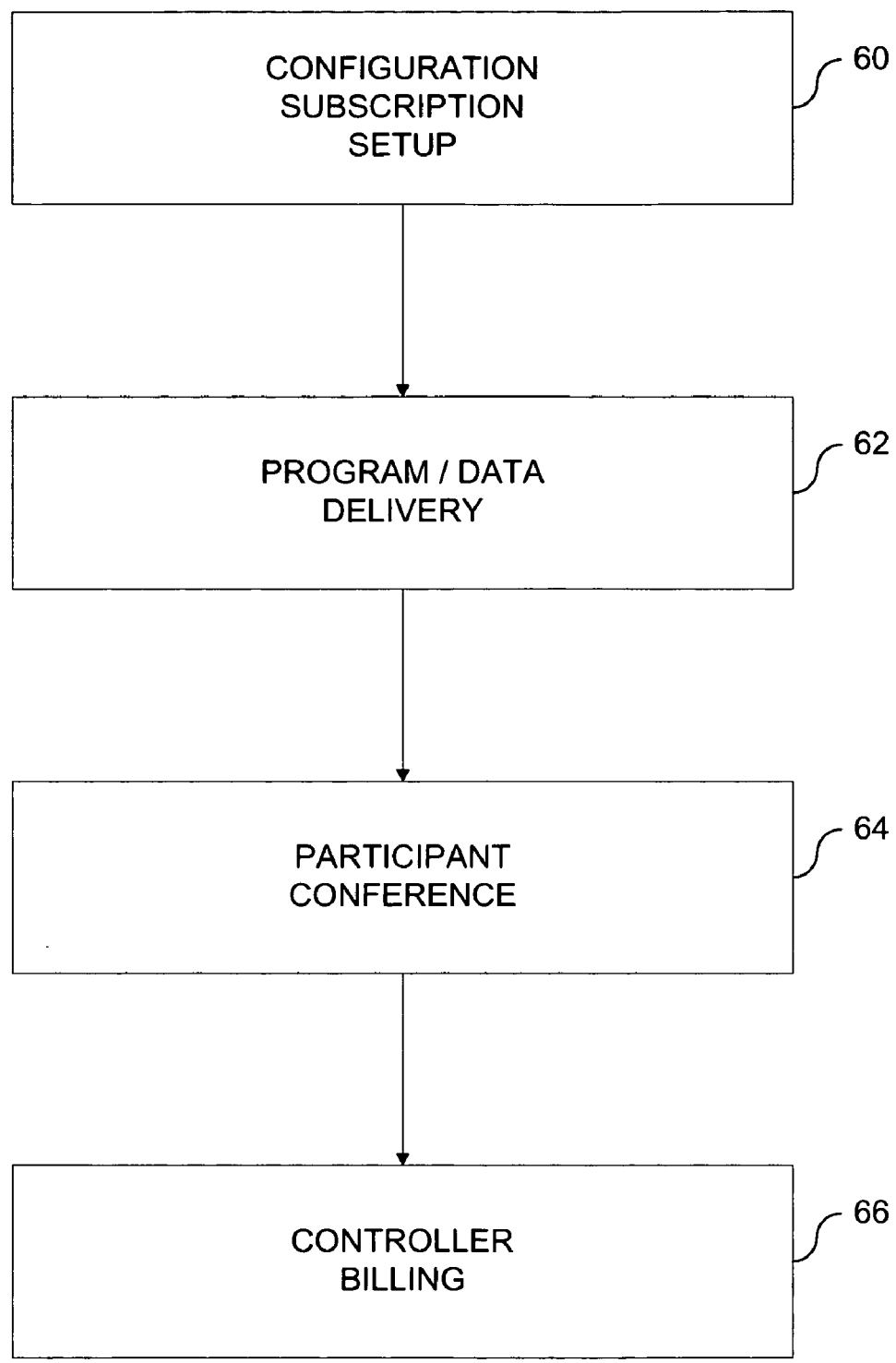
FIG. 5 is flow chart of operational steps of present invention.

FIG. 5 shows operational flow chart, including steps for system configuration and subscription set-up 60, program and/or data delivery 62, participant conference 64, and controller billing 66. Preferably, controller 8, serves as central processor to coordinate DTV unit set-up, user smart-card account authorization or identity authentication program/data and/or conference scheduling, programming, viewing, output formatting, conference access and communication, billing, advertising, and other associated activity, particularly for managing access to program 2, data 4, as well as DTV video conferencing signals 20. To reduce latency, controller 8 may transmit static image instead of live video.

For example, controller 8 may authorize or cause certain DTV units to be added or removed dynamically from one or more video conferencing active set or selected logical group, as well as restrict select DTV unit(s) from viewing certain program and/or data. Moreover, controller 8 monitors one or more actual program/data viewing and/or conferencing usage for appropriate billing. Furthermore, controller 8 may direct personalized or targeted commercial, incentive, or advertising messages to certain recognized demographic interest group, DTV subscribers or participant video conferencing parties.

Preferably, controller 8 directs such messages dynamically or adaptively according to current subscriber or participant information activity or needs, as well as product availability, market pricing, or other commercial attribute. Additionally, controller 8 may take corrective action or functional adjustment to redirect, restrict, control, or otherwise manage network, program/data, or other system resources, upon detecting actual or possible performance bottlenecks or other equipment or connection fault causing undesirable impact on such information delivery.

In one embodiment of present invention, DTV system is configured for luxury-suite type or other effectively exclusive membership multi-user conferenced viewing of live sports event, such that professional football, basketball, baseball, hockey, soccer, or other competitive individual, team, or tournament telecast is provided as program 2 through broadcast channel 6, including preferably statistical or background data 4 about player, team, or other related game aspect. In particular, controller 8 provides proper access by authorized DTV subscribers 18 to such sports program and/or data. Additionally, controller 8 coordinates or monitors video conferencing activity occurring directly or indirectly between DTV units watching common program/data stream.

Hence, for example, initially, during configuration subscription setup phase 60, system or headend controller 8 begins to identify system configuration, network address, program order and account status of any subscriber units coupled thereto over broadcast 6 and/or network 10 channels. Commercial transaction may occur to define DTV receiver unit user subscriptions, particularly for authenticating, billing, scheduling, notifying, requesting or otherwise providing desired access to any upcoming or current program 2 or database 4. As appropriate, controller 8 may conduct remote diagnostics over such channels to various units 12, 14, 16 to ensure proper functioning for signal delivery.

Next, program and/or data delivery may commence according to controller 8 programmable selection to enable digital transmission for electronic signal delivery 62 of certain program 2 and/or data 4 for presentation in integrated display 50 of selected or addressed DTV subscriber units 18. Then, thereafter, prior, or simultaneously, select participants 56 are enabled for video conferencing 20, particularly by allowing such participants to be monitored by activated video camera 26 and/or microphone 28, for transmission of monitored static image or live motion video compressed encoded digital signal for presentation in display screen 50. Upon completion of program/data delivery and conferencing activity, controller 8 may send proper billing indications to participant DTV units. Controller 8 may appropriately add or delete subscriber 18 in active database.

Therefore, in this combined DTV program/data viewing and select viewer conferencing scheme, important objective of emulating luxury-suite or otherwise more collaborative, intimate or personal conditions among associated audience members located at different locations is achieved effectively.

Optionally, while receiving program/data, conferenced subscriber may also send or receive electronic text message to other subscribers or other mail account addressable through network 10, or run various application programs locally or in distributed client-server networked manner, preferably in common with other conferenced DTV units, such as for multi-user simulation or gaming application.

To improve system program/data broadcast or video conferencing performance, for example, when restricted effectively by channel bandwidth or traffic congestion, controllers 8, 34 may reduce or eliminate actual transmission of full content video signal, and preferably transmit information subset, such as static image, text and/or voice.

Foregoing described embodiments of invention are provided as illustration and description. It is not intended to limit invention to precise form described. Other variations and embodiments are possible in light of above teaching, and it is thus intended that scope of invention not be limited by detailed description, but rather by claims as follow.

We claim:

1. Wireless mobile subscriber unit for real-time collaborative communication comprising:
   an embedded processor; a user media interface; and a mobile communication interface;
   wherein the user media interface comprises a microphone and a digital video or image camera for sending respectively a first audio signal and a first image signal, and a speaker and a display for receiving respectively a second audio signal and a second image signal; the first and second audio and image signals being transmitted or received via wireless radio-frequency communication through the mobile communication interface; the embedded processor enabling two-way image or audio communication for conferencing between multiple subscriber units through the user media interface while simultaneously, prior or after accessing a one-way broadcast or transmission of a common program or data stream through the mobile communication interface, wherein a controller centrally manages combined one- and two-way services of conferencing coupled with broadcast or transmission by authorizing or restricting access to the program or data stream by one or more subscriber units during, after or prior the conference, thereby enabling collaborative access by a virtual audience to integrated conferencing and broadcast or transmission services, wherein the controller functionally overlays: (a) the common program or data stream that is wirelessly accessed by a plurality of the subscriber units, with (b) the conference authorized directly between privately-restricted conferencing subscriber units.

2. The subscriber unit of claim 1 wherein:
the user media interface displays a text message from a conferencing subscriber unit.

3. The subscriber unit of claim 1 wherein:
the broadcast or transmission comprises a sports program provided by a direct broadcast satellite.

4. The subscriber unit of claim 1 wherein:
the broadcast or transmission comprises an interactive program for multi-user gaming.

5. The subscriber unit of claim 1 wherein:
the broadcast or transmission comprises an agent program for multi-user scheduling.

6. The subscriber unit of claim 1 further comprising:
authorization means for reading a smartcard to enable multiple subscriber unit conferencing.

7. The subscriber unit of claim 1 wherein:
the broadcast or transmission comprises an advertisement or narrowcast message directable selectively to one or more subscriber unit belonging to a target group.

8. The subscriber unit of claim 1 wherein:
the broadcast or transmission comprises a bill for a particular subscriber unit according to a monitored usage by the particular subscriber unit.

9. The subscriber unit of claim 1 wherein:
the broadcast or transmission comprises a whiteboard or graphical screen application for collaboration by a plurality of subscriber units belonging to a workgroup.

10. The subscriber unit of claim 1 wherein:
the display comprises means for displaying adjacently a plurality of video or program images.

11. The subscriber unit of claim 1 wherein:
the common program or data stream comprises a sports game, statistics or analysis, whereby a virtual game or simulation program may be run locally by the subscriber unit user in common with another subscriber unit.

12. The subscriber unit of claim 1 wherein:
a user media capability or address, program or data content, or actual or possible channel bandwidth congestion or network connection fault is identified, thereby enabling restricted, redirected, or reduced transmission effectively to improve or transcode such conferencing or broadcast or transmission.

13. The subscriber unit of claim 1 wherein:
an intelligent software agent is used to run a network search, thereby enabling selection of the common program or data stream for scheduled viewing, storage or delivery to one or more subscriber units.

14. The subscriber unit of claim 1 wherein:
a personalized or targeted commercial or advertisement is directed to one or more subscriber units for customized screen display or incentive messaging dynamically or adaptively according to such subscriber unit action or commercial attribute, thereby enabling the embedded processor to integrate, combine or mix graphically such commercial or advertisement with or within the common program or data stream.

15. The subscriber unit of claim 1 wherein:
the embedded processor enables authorization or authentication of such conference or access via subscriber unit memory card, thereby enabling authorization or authentication for internet, cable, satellite, optical fiber, microwave, MMDS, LMDS, wireless or other delivery source of the common program or data stream.

16. The subscriber unit of claim 1 wherein:
the conference and broadcast are enabled to be accessed by a non-mobile subscriber unit comprising a residential or business set-top device, digital television, or personal computer.

17. Wireless communication method between multiple mobile subscriber units for real-time collaboration comprising the steps of:
enabling a conference between a plurality of mobile subscriber units, at least one subscriber unit transmitting or receiving an audio or video signal to or from another subscriber unit via wireless communication; and
broadcasting or transmitting to at least one conferencing subscriber unit a common program or data stream via wireless communication, simultaneously during, prior or after the conference, wherein a central controller coordinates integrated services for conferencing and broadcasting or transmission by authorizing or restricting access to the program or data stream by one or more subscriber units during, prior or after the conference, thereby providing centrally-coordinated network collaboration via such integrated services, wherein the controller functionally overlays: (a) the common program or data stream that is wirelessly accessed by a plurality of the subscriber units, with (b) the conference authorized directly between privately-restricted conferencing subscriber units.

18. The communication method of claim 17 wherein:
a text message from a first subscriber unit is displayed by a second subscriber unit.

19. The communication method of claim 17 wherein:
the broadcast or transmission comprises a sports program provided by a direct broadcast satellite.

20. The communication method of claim 17 wherein:
the broadcast or transmission comprises an interactive program for multi-user gaming.

21. The communication method of claim 17 wherein:
the broadcast or transmission comprises an agent program for multi-user scheduling.

22. The communication method of claim 17 wherein:
the conference and broadcast or transmission are enabled by a smartcard.

23. The communication method of claim 17 wherein:
the broadcasting or transmitting step comprises sending an advertisement or narrowcast message directable selectively by controller means to one or more subscriber unit belonging to a target group.

24. The communication method of claim 17 wherein:
the broadcasting or transmitting step comprises sending a bill for a particular subscriber unit according to a monitored usage by the particular subscriber unit.

25. The communication method of claim 17 wherein:
the broadcasting or transmitting step comprises sending a whiteboard or graphical screen application for collaboration by a plurality of subscriber units belonging to a workgroup.

26. The communication method of claim 17 wherein:
at least one conferencing subscriber unit comprises means for displaying adjacently a plurality of video or program images.

27. The communication method of claim 17 wherein:
the common program or data stream comprises a sports game, statistics or analysis, whereby a virtual game or simulation program may be run locally by the conferencing subscriber unit in common with another conferencing subscriber unit.

28. The communication method of claim 17 wherein:
a user media capability or address, program or data content, or actual or possible channel bandwidth congestion or network connection fault is identified, thereby enabling restricted, redirected, or reduced transmission effectively to improve or transcode such conferencing or broadcast or transmission.

29. The communication method of claim 17 wherein:
an intelligent software agent runs a network search, thereby enabling selection of the common program or data stream for scheduled viewing, storage or delivery to one or more subscriber units.

30. The communication method of claim 17 wherein:
a personalized or targeted commercial or advertisement is directed to one or more subscriber units for customized screen display or incentive messaging dynamically or adaptively according to such subscriber unit action or commercial attribute, thereby enabling integration, combination or mixture graphically of such commercial or advertisement with or within the common program or data stream.

31. The communication method of claim 17 wherein:
such conference or access is authorized or authenticated via subscriber unit memory card, thereby enabling authorization or authentication for internet, cable, satellite, optical fiber, microwave, MMDS, LMDS, wireless or other delivery source of the common program or data stream.

32. The communication method of claim 17 wherein:
the conference and broadcast enabled to be accessed by a non-mobile subscriber unit comprising a residential or business set-top device, digital television, or personal computer.

33. Wireless communication controller for providing real-time conferencing between multiple mobile subscriber units comprising:
a digital repository; and controller means for accessing data in the digital repository;
wherein the digital repository stores a first representation of a conference between a plurality of mobile subscriber units, at least one subscriber unit transmitting or receiving an audio or video signal to or from another subscriber unit via wireless communication, and a second representation of a broadcast or transmission to at least one conferencing subscriber unit of a common program or data stream via wireless communication, simultaneously during, prior or after the conference, wherein said controller means controls both conference and broadcast or transmission services by authorizing or restricting access to the program or data stream by one or more subscriber units commonly or selectively during, after or prior the conference, thereby delivering integrated conferencing and broadcast or transmission services for virtual audience community, wherein the controller means functionally overlays: (a) the common program or data stream that is wirelessly accessed by a plurality of the subscriber units, with (b) the conference authorized directly between privately-restricted conferencing subscriber units.

34. The communication controller of claim 33 wherein:
the broadcast or transmission comprises a sports program provided by a direct broadcast satellite.

35. The communication controller of claim 33 wherein:
the broadcast or transmission comprises an interactive program for multi-user gaming.

36. The communication controller of claim 33 wherein:
the broadcast or transmission comprises an agent program for multi-user scheduling.

37. The communication controller of claim 33 wherein:
the conference and broadcast or transmission are enabled by a smartcard.

38. The communication controller of claim 33 wherein:
the broadcast or transmission comprises an advertisement or narrowcast message directable selectively by controller means to one or more subscriber unit belonging to a target group.

39. The communication controller of claim 33 wherein:
the broadcast or transmission comprises a bill for a particular subscriber unit according to a monitored usage by the particular subscriber unit.

40. The communication controller of claim 33 wherein:
the broadcast or transmission comprises a whiteboard or graphical screen application for collaboration by a plurality of subscriber units belonging to a workgroup.

41. The communication controller of claim 33 wherein:
at least one subscriber unit comprises means for displaying adjacently a plurality of video or program images.

42. The communication controller of claim 33 wherein:
the common program or data stream comprises a sports game, statistics or analysis, whereby a virtual game or simulation program may be run locally by the conferencing subscriber unit in common with another conferencing subscriber unit.

43. The communication controller of claim 33 wherein:
the controller means identifies a user media capability or address, program or data content, or actual or possible channel bandwidth congestion or network connection fault, thereby enabling restricted, redirected, or reduced transmission effectively to improve or transcode such conferencing or broadcast or transmission.

44. The communication controller of claim 33 wherein:
the controller means or one or more subscriber units enables an intelligent software agent to run a network search, thereby enabling selection of the common program or data stream for scheduled viewing, storage or delivery to one or more subscriber units.

45. The communication controller of claim 33 wherein:
the controller means directs a personalized or targeted commercial or advertisement to one or more subscriber units for customized screen display or incentive messaging dynamically or adaptively according to such subscriber unit action or commercial attribute, thereby enabling integration, combination or mixture graphically of such commercial or advertisement with or within the common program or data stream.

46. The communication controller of claim 33 wherein:
such conference or access is authorized or authenticated via subscriber unit memory card, thereby enabling authorization or authentication for internet, cable, satellite, optical fiber, microwave, MMDS, LMDS, wireless or other delivery source of the common program or data stream.

47. The communication controller of claim 33 wherein:
the conference and broadcast are enabled to be accessed by a non-mobile subscriber unit comprising a residential or business set-top device, digital television, or personal computer.

48. Subscriber unit for real-time collaborative network gaming comprising:
a processor; and a network interface;
wherein the processor runs a multi-user game application locally or across a network via the network interface in common with an other subscriber unit effectively running the same multi-user game application, whereby the other subscriber is coupled via the network interface to enable audio or video conferencing or messaging between coupled subscriber units effectively playing the same multi-user game application during such conferencing or messaging, the network interface being coupled to a gaming community network controller for centrally controlling access in common or selectively by one or more subscriber units to both the conferencing or messaging and the multi-user game application, wherein the controller functionally overlays: (a) the game application that is accessed by a plurality of subscriber units, with (b) the conference or messaging authorized directly between privately-restricted conferencing or messaging subscriber units.

49. The subscriber unit of claim 48 wherein:
the processor runs a software program or an intelligent agent for searching or transacting via the network, thereby enabling network delivery of or access to one or more multi-user game application.

50. The subscriber unit of claim 48 further comprising:
a user interface for displaying at least one screen element representing a subscriber playing the same multi-user game application while conferencing or messaging.

51. Communication controller for providing real-time gaming and conferencing between multiple subscriber units comprising:
means for coupling to a first subscriber unit playing a multi-user game application; and
means for coupling to a second subscriber unit playing effectively the same multi-user game application;
whereby an audio or video conference or message is enabled between the first and second subscriber units while, after or before playing effectively the same multi-user game application, such that the communication controller functions effectively as a system headend controller in an integrated broadband services network for multi-user gaming and conferencing or messaging, thereby enabling centralized network control of subscriber access in common or selectively by one or more subscriber units to both conferencing or messaging and multi-user game application services, wherein the control functionally overlays: (a) the game application that is accessed by both subscriber units, with (b) the conference or messaging authorized directly between privately-restricted conferencing or messaging subscriber units.

52. The communication controller of claim 51 further comprising:
means for controlling or restricting access to the conference or message by an additional subscriber unit playing effectively the same multi-user game application.

53. The communication controller of claim 51 further comprising:
means for sending a narrowcast message or commercial advertisement to the first or second subscriber unit adaptively or dynamically in response to such subscriber unit gaming, conferencing or messaging action, thereby enabling network transaction or billing according to actual gaming or conferencing usage by such subscriber unit.

54. Communication method between multiple subscriber units for real-time collaborative gaming comprising the steps of:

running a multi-user game application effectively in common by a plurality of subscriber units locally or across a network; and conferencing or messaging between the subscriber units via the network while running the multi-user game application;

wherein a system headend controller for multi-user gaming and conferencing or messaging centrally controls access by one or more subscriber units to conferencing or messaging while, before or after such one or more subscriber units runs the multi-user game application, wherein the controller functionally overlays: (a) the game application that is accessed by the plurality of subscriber units, with (b) the conference or messaging authorized directly between privately-restricted conferencing or messaging subscriber units.

55. The communication method of claim 54 wherein:

the multi-user game application comprises a simulated sports game, whereby a screen element representing at least one subscriber unit playing the multi-user game application is displayed during the conference or message.

56. The communication method of claim 54 wherein:

one or more subscriber unit receives a personalized message or bill for actual usage of or participation in such game application, conference or messaging.

57. Multi-user game application comprising:

a simulator or gaming program for access by a plurality of users via a network; and means for conferencing textually, audibly or visually between the users, thereby enabling a virtual community among on-line players;

wherein a broadband system processor for integrated multi-user gaming and conferencing centrally controls access by one or more users to conferencing while, before or after one or more user may access the simulator or gaming program, wherein the processor functionally overlays: (a) the simulator or gaming program that is accessed by the plurality of users, with (b) the conference authorized directly between privately-restricted conferencing users.

58. The application of claim 57 wherein:

one or more of the users is billable or receives an advertisement according to a controller for controlling user access to the program.

59. Integrated television gaming and conferencing console comprising:

means for conferencing a first user with another integrated television gaming and conferencing user for video, audio or text messaging or chat before, while or after a television or gaming program broadcast or data application is accessed commonly by both users from memory or via a network data interface or broadcast program channel, whereby such conference and common access are integrated functionally for management or coordination by a centralized television/gaming access and user-conference controller coupled to both users for delivering or enabling a combined broadband television gaming and conferencing service, wherein the controller functionally overlays: (a) the television or gaming program broadcast or data application that is accessed by both users, with (b) the conference authorized directly between privately-restricted conferencing users.

60. Console of claim 59 wherein:

the program broadcast or data application comprises a video game or simulation program run locally by both users, whereby the centralized controller bills one or more user for combined gaming and conferencing service.

61. Console of claim 59 wherein:

the controller or console programmably identifies a user media capability or address, program or data content, or actual or possible channel bandwidth congestion or network connection fault according to a program for restricting, redirecting, or reducing transmission of the conference or access.

62. Console of claim 59 wherein:

the controller or console runs software for searching for the program broadcast or data application for delivery to or access by a virtual audience of users authorized for such delivery or access in common.

63. Console of claim 59 wherein:

the controller directs a targeted or narrowcast commercial, advertisement or message to one or more user for customized or personalized screen display or incentive messaging dynamically or adaptively according to user action or commercial attribute, wherein the commercial, advertisement or message is integrated, combined or mixed with or within the program broadcast or data application.

64. Console of claim 59 wherein:

the controller authorizes the combined service by authenticating a set-top device coupled via internet, cable, satellite, optical fiber, microwave, MMDS, LMDS, or wireless channel.

65. Internet protocol television transaction method comprising step of:

transacting with a system controller by a first internet protocol television subscriber unit conferencing with a second internet protocol television subscriber unit before, while or after a program broadcast or data application for multi-user gaming is accessed in common by the first and second subscriber units from memory or via a network data interface or broadcast program channel, whereby such conference and access are integrated functionally for transaction management by the system controller centrally coupled to both subscriber units to authorize combined conferencing and gaming service for multiple gaming and conferencing subscriber units, wherein the controller functionally overlays: (a) the program broadcast or data application for multi-user gaming that is accessed by both subscriber units, with (b) the conference authorized directly between privately-restricted conferencing subscriber units.

66. Method of claim 65 wherein:

the controller determines a subscriber unit capability or address, program or data content, or actual or possible channel bandwidth congestion or network connection fault, thereby enabling restricted, redirected, or reduced transmission effectively to improve such conference or access.

67. Method of claim 65 wherein:

the controller or first subscriber unit runs software for searching or selecting the common program broadcast or data application to enable combined conferencing and multi-user gaming.

68. Method of claim 65 wherein:

a personalized or targeted advertisement is provided to the first subscriber unit for customized messaging or incentive dynamically or adaptively according to subscriber unit action or user commercial attribute, such advertisement being integrated, combined or mixed with or within the program broadcast or data application.

69. In a networked device, a programmable broadband service software comprising:

firmware or computer code for authorizing a conference between a first broadband subscriber unit and a second broadband subscriber unit before, while or after a multi-player game program broadcast or data application is accessed from memory or via a network data interface or broadcast program channel by at least one subscriber unit, whereby both the conferencing and accessing are authorized by an integrated broadband service provider centrally coupled to such subscriber units, wherein the service provider functionally overlays: (a) the multi-player game program broadcast or data application that is accessed by both subscriber units, with (b) the conference authorized directly between privately-restricted conferencing subscriber units.

70. Software of claim 69 wherein:

the program broadcast or data application is selectable programmably according to a software search, whereby a message adapted to such search is integrated, combined or mixed with or within the common program broadcast or data application.

71. Mobile television and gaming signal processor comprising:

a processor for conferencing a first mobile gaming user with a second gaming user before, while or after a television or gaming program broadcast or application is accessed from memory or via a network data interface or broadcast program channel by at least one common gaming user, whereby such conference and access are integrated functionally for combined authorization centrally by a network controller coupled to both gaming users, wherein the controller functionally overlays: (a) the television or gaming program broadcast or application that is accessed by both gaming users, with (b) the conference directly between authorized privately-restricted conferencing gaming users; and a digital codec for processing an access or conference signal.

72. Signal processor of claim 71 wherein:

the codec processes a message personalized for the first mobile gaming user, such message being integrated, combined or mixed with or within the access signal.

73. Wireless gaming and conference signal processing method comprising the steps of:

conferencing wirelessly a gaming subscriber with another subscriber before, while or after a multi-user game program broadcast or application is accessed from memory or via a network data interface or broadcast program channel, both wireless conference and multi-user game access being authorized centrally by a controller for providing combined conference and game access to both subscribers, wherein the controller functionally overlays: (a) the multi-user game program broadcast or application that is accessed by both subscribers, with (b) the conference directly between privately-restricted authorized conferencing subscribers; and processing an access or conference signal using a codec.

74. Wireless broadband network apparatus comprising:

a broadband system controller for enabling access by at least one wireless subscriber to a digital television or multi-user gaming broadcast program or network data signal; and means for conferencing between the accessing subscribers during, before or after such access, the controller centrally coupled for authorizing access by such subscribers in common to digital television or multi-user gaming service integrated functionally with conferencing by at least one subscriber accessing the digital television or multi-user game program or signal, wherein the controller functionally overlays: (a) the digital television or multi-user gaming broadcast program or network data signal that is accessed by a plurality of the subscribers, with (b) the conference authorized directly between privately-restricted conferencing subscribers.

75. In an interactive system comprising a data management system for authorizing subscriber service, a database comprising:

a database representing one or more subscriber account authorized to access a program or data for online broadband service, and conduct a conference between authorized subscribers while, after or before such subscribers access the program or data;

wherein a controller centrally authorizes the access to both the program or data and the conference, wherein the controller functionally overlays: (a) the program or data for online broadband service that is accessed by a plurality of subscribers, with (b) the conference authorized directly between privately-restricted conferencing subscribers.

76. Database of claim 75 wherein:

the program or data comprises one or more multi-user gaming or digital television program or signal, whereby a plurality of authorized subscribers access in common the multi-user gaming or digital television program or signal, while, after or before the conference is conducted between the plurality of subscribers.

77. In an interactive network device for accessing a gaming program or data signal and conferencing with another interactive network device while, before or after accessing the same program or data signal, a method for integrating broadband service comprising steps of:

outputting by a first network device interactively a gaming program or data signal; and integrating in such output at least one participant accessing the gaming program or data signal, wherein a controller coupled centrally to each conferencing network device authorizes access by a plurality of participants to the gaming program or data signal while, before or after the authorized participants conduct a conference with each other, wherein the controller functionally overlays: (a) the gaming program or data signal that is accessed by the plurality of participants with (b) the conference authorized directly between privately-restricted conferencing participants.

78. A set-top gaming device for coupling to a media output comprising:

a set-top processor, and a network interface;

wherein the set-top processor enables a conference by a subscriber with another subscriber during, before or after access by both subscribers to a multi-subscriber gaming program; the media output generating an integration of one or more conferencing subscriber and the accessed gaming program, wherein a controller couples to the network interface for authorizing centrally the access and conference as a combined subscription service for on-line gaming community, wherein the controller functionally overlays: (a) the multi-subscriber gaming program that is accessed by a plurality of subscribers, with (b) the conference authorized directly between privately-restricted conferencing subscribers.

* * * * *

US 7,221,387 C1

(12) EX PARTE REEXAMINATION CERTIFICATE (10460th)
United States Patent
Fernandez et al.

(10) Number: US 7,221,387 C1
(45) Certificate Issued: *Jan. 5, 2015

(54) DIGITAL TELEVISION WITH SUBSCRIBER CONFERENCE OVERLAY

(75) Inventors: Dennis S. Fernandez, Atherton, CA (US); Irene Y. Hu, Belmont, CA (US)

(73) Assignee: Dennis S. Fernandez, Atherton, CA (US)

Reexamination Request:
No. 90/012,262, Apr. 24, 2012

Reexamination Certificate for:
Patent No.: 7,221,387
Issued: May 22, 2007
Appl. No.: 10/444,261
Filed: May 22, 2003

( * ) Notice: This patent is subject to a terminal disclaimer.

Related U.S. Application Data

(60) Continuation of application No. 10/026,095, filed on Dec. 21, 2001, now Pat. No. 6,590,602, which is a division of application No. 09/095,390, filed on Jun. 10, 1998, now Pat. No. 6,339,842.

(51) Int. Cl.
*H04N 7/14* (2006.01)

(52) U.S. Cl.
USPC ............ 348/14.08; 348/14.09; 348/E5.099; 348/E5.104; 348/E5.108; 348/E7.071; 348/E7.083; 725/62; 725/64

(58) Field of Classification Search
None
See application file for complete search history.

(56) References Cited

To view the complete listing of prior art documents cited during the proceeding for Reexamination Control Number 90/012,262, please refer to the USPTO's public Patent Application Information Retrieval (PAIR) system under the Display References tab.

*Primary Examiner* — John M Hotaling

(57) ABSTRACT

Digital television system overlays subscriber two-way communication during broadcast program delivery to create virtual audience community. Individual or group billing and advertisement is personalized per DTV receiver program viewing and/or conferencing activity. Subscriber receiver includes camera and other media I/O device for multi-way video conferencing. Participants may be added or removed dynamically during programming or conferencing.

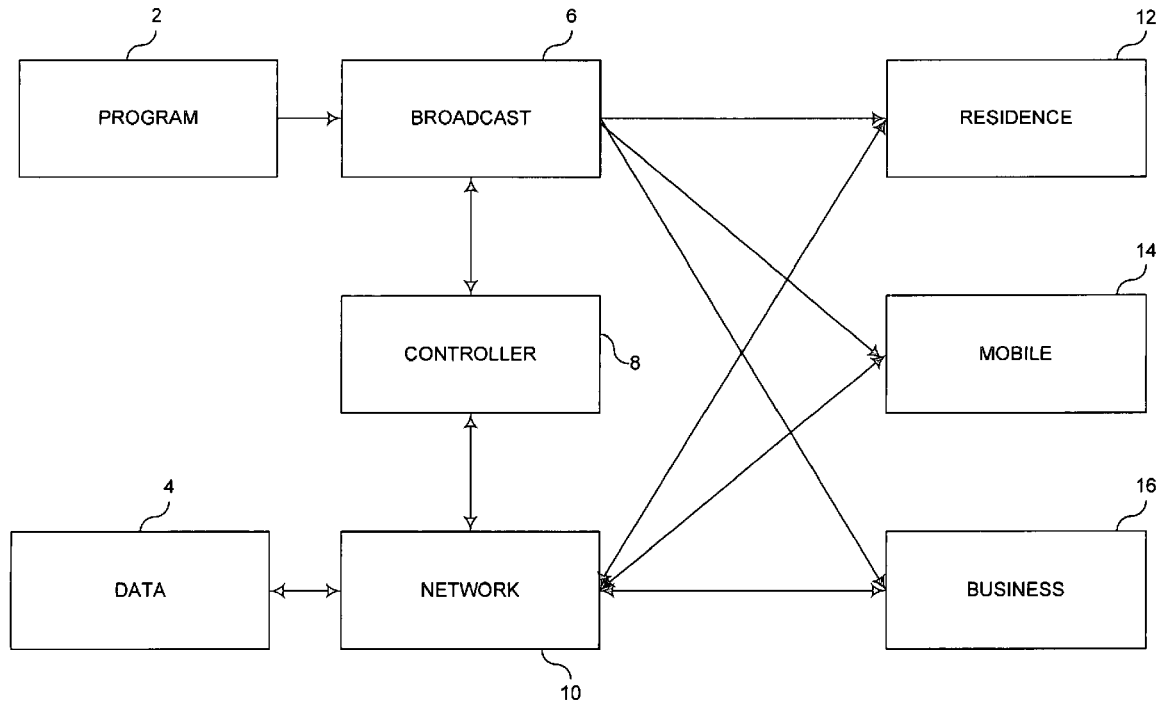

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2, 4, 7, 10-12, 16-18, 20, 23, 26-28, 32, 33, 35, 38, 41, 42, 47-69 and 71-78 are cancelled.

Claims 3, 5, 6, 8, 9, 13-15, 19, 21, 22, 24, 25, 29-31, 34, 36, 37, 39, 40, 43-46 and 70 were not reexamined.

\* \* \* \* \*

(12) INTER PARTES REEXAMINATION CERTIFICATE (1056th)
United States Patent
Fernandez et al.

(10) Number: US 7,221,387 C2
(45) Certificate Issued: *Feb. 25, 2015

(54) DIGITAL TELEVISION WITH SUBSCRIBER CONFERENCE OVERLAY

(75) Inventors: Dennis S. Fernandez, Atherton, CA (US); Irene Y. Hu, Belmont, CA (US)

(73) Assignee: Dennis S. Fernandez, Atherton, CA (US)

Reexamination Request:
No. 95/001,958, Apr. 4, 2012

Reexamination Certificate for:
Patent No.: 7,221,387
Issued: May 22, 2007
Appl. No.: 10/444,261
Filed: May 22, 2003

Reexamination Certificate C1 7,221,387 issued Jan. 5, 2015

(*) Notice: This patent is subject to a terminal disclaimer.

Related U.S. Application Data

(60) Continuation of application No. 10/026,095, filed on Dec. 21, 2001, now Pat. No. 6,590,602, which is a division of application No. 09/095,390, filed on Jun. 10, 1998, now Pat. No. 6,339,842.

(51) Int. Cl.
 *H04N 7/14* (2006.01)
(52) U.S. Cl.
 USPC ............. 348/14.08; 348/14.09; 348/E5.099; 348/E5.104; 348/E5.108; 348/E7.071; 348/E7.083; 725/62; 725/64
(58) Field of Classification Search
 None
 See application file for complete search history.

(56) References Cited

To view the complete listing of prior art documents cited during the proceeding for Reexamination Control Number 95/001,958, please refer to the USPTO's public Patent Application Information Retrieval (PAIR) system under the Display References tab.

*Primary Examiner* — John M Hotaling

(57) ABSTRACT

Digital television system overlays subscriber two-way communication during broadcast program delivery to create virtual audience community. Individual or group billing and advertisement is personalized per DTV receiver program viewing and/or conferencing activity. Subscriber receiver includes camera and other media I/O device for multi-way video conferencing. Participants may be added or removed dynamically during programming or conferencing.

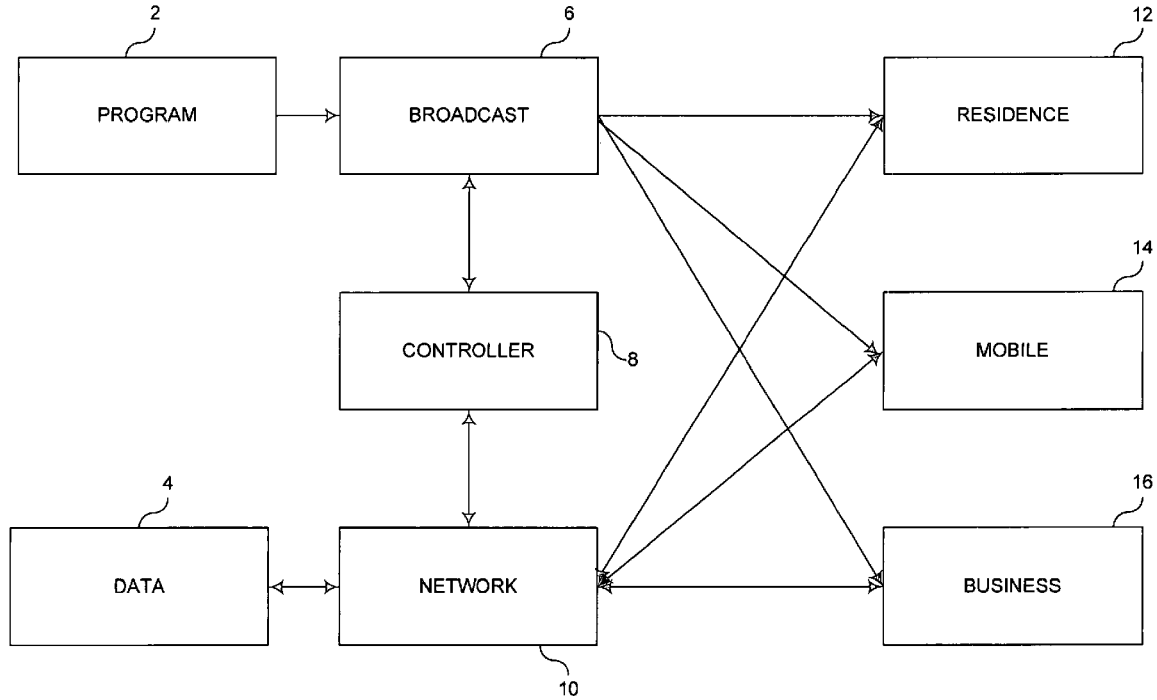

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1, 2, 4, 7, 10-12, 16-18, 20, 23, 26-28, 32, 33, 35, 38, 41, 42, 47-69 and 71-78 were previously cancelled.

Claims 3, 5, 6, 8, 9, 13, 14, 15, 19, 21, 22, 24, 25, 29-31, 34, 36, 37, 39, 40, 43-46 and 70 are cancelled.

* * * * *